United States Patent [19]
Kuroda

[11] Patent Number: 6,122,653
[45] Date of Patent: Sep. 19, 2000

[54] BLOCK IIR PROCESSOR UTILIZING DIVIDED ALU OPERATION INSTRUCTIONS

[75] Inventor: Ichiro Kuroda, Tokyo, Japan

[73] Assignee: NEC Corporation, Tokyo, Japan

[21] Appl. No.: 08/990,521

[22] Filed: Dec. 15, 1997

[30] Foreign Application Priority Data

Dec. 13, 1996 [JP] Japan ..................................... 8-352668

[51] Int. Cl.$^7$ .................................................. G06F 17/10
[52] U.S. Cl. .......................................... 708/320; 708/303
[58] Field of Search ....................... 364/724.013, 724.17, 364/750.5; 708/303, 320, 603

[56] References Cited

U.S. PATENT DOCUMENTS 5,319,584   6/1994   Ooyabu ............................. 364/724.013
5,636,150   6/1997   Okamoto ............................. 364/724.17

OTHER PUBLICATIONS

"MC88110 Second Generation RISC Microprocessor User's Manual", Motorola Inc., pp. 5–1 to 5–26, 1991.
Jackson, "Digital Filters and Signal Processing", Kluwer Academic Publishers, 1986, pp. 229–234.
Craig Hansen, "Architecture of a Broadband Mediaprocessor", 1996, pp. 334–340.
Curtis Abbott,"Broadband Algorithms with the MicroUnity Mediaprocessor", 1996, pp. 349–354.

Primary Examiner—Tan V. Mai
Attorney, Agent, or Firm—Foley & Lardner

[57] ABSTRACT

A block infinite impulse response (IIR) processor has a first input register storing data of the block length "L" and capable of shifting the stored data by an integer times the data word length, a first coefficient register file, a second input register, a second coefficient register file, a third input register, a third coefficient register file, a register, a shift register, an accumulator and a multiply-and-accumulate unit for multiplying respective data blocks in the register by a least significant word in the shift register, and for adding the result of the multiplication to a value of the accumulator, for executing a parallel operation of "L" multiply-and-accumulate operations. Thus, by adopting the block IIR filter algorithm which makes it possible to simultaneously calculate a plurality of samples in a processor having a divided-ALU instructions for executing a plurality of multiply-and-accumulate operations in parallel to one another, the filter operation can be speeded up by use of the parallel arithmetic operation. The operation can be also speeded up by reducing the number of multiply-and-accumulate operations in accordance with the order of the filter because of the nature of coefficients.

4 Claims, 2 Drawing Sheets

BLOCK IIR PROCESSOR UTILIZING DIVIDED ALU OPERATION INSTRUCTIONS

BACKGROUND OF THE INVENTION

1. Field of the Invention

The present invention relates to a digital signal processor, and more specifically to a technique for realizing a recursive digital filter by a parallel arithmetic processing of microprocessor type hardware device.

2. Description of Related Art

In a microprocessor, recently, a divided-ALU operation instruction (also called a group instruction) is beginning to be adopted in order to speed up an image processing such as MPEG (Moving Picture Experts Group).

For example, the divided-ALU instruction is an instruction for utilizing one 64-bit ALU (Arithmetic and Logical Unit) as four 16-bit ALUs, as shown in FIG. 1.

An example of the divided-ALU instruction is proposed by Craig Hansen, "Architecture of a Broadband Mediaprocessor", IEEE Proceedings of COMPCON '96, 1996, pages 334–340, the content of which is incorporated by reference in its entirety into this application.

By adopting the divided-ALU, it is possible to easily speed up a signal processing having data parallelism and an image processing. An example of this is also proposed by Curtis Abbott et al, "Broadband Algorithms with the MicroUnity Mediaprocessor", IEEE Proceedings of COMPCON '96, 1996, pages 349–354, the content of which is incorporated by reference in its entirety into this application.

However, even if the divided-ALU is adopted, the speed-up of the processing is not so easy in the case that a signal flow is recursive and is difficult to parallelize, as in an IIR (infinite impulse response) digital filter.

SUMMARY OF THE INVENTION

Accordingly, it is an object of the present invention to overcome the above mentioned defect of the conventional one.

Another object of the present invention is to provide a block IIR processor, configured to realize a high speed filter operation by means of a parallel arithmetic operation, by adopting a block IIR filter algorithm simultaneously calculating a plurality of samples, in a processor having the divided-ALU instructions for executing arithmetic operations in parallel by a plurality of multiply-and-accumulate means.

A further object of the present invention is to provide a block IIR processor, capable of realizing a high speed operation by reducing the number of multiply-and-accumulate operations in accordance with the order of the filter in view of the nature of coefficients.

The above and other objects of the present invention are achieved in accordance with the present invention by a block IIR processor comprising a first input register storing data of the block length "L" and capable of shifting the stored data by integer times the data word length, a first coefficient register file, a second input register, a second coefficient register file, a third input register, a third coefficient register file, a register, a shift resister, an accumulator and a multiply-and-accumulate unit for multiplying respective data blocks in the register by a least significant word in the shift register, and for adding the result of the multiplication to a value of the accumulator, for executing a parallel operation of "L" multiply-and-accumulate operations.

With this arrangement, input data of the block size "L" is stored in the first input register, and a content of the first input register is transferred to the shift register. While shifting rightward the content of the shifter register one data word length by one data word length, values of a respective register in the first coefficient register file, corresponding to a column, all values in which are not 0 (zero), are transferred to the register, so that a parallel multiply-and-accumulate operation is executed a plurality of times in the multiply-and-accumulate operation unit. Thus, a first matrix vector multiplication is executed, and the result of the multiplication is accumulated in the accumulator.

A content of the second input register is transferred to the shift register while shifting rightward the content of the shifter register one data word length by one data word length, values of a respective register in the second coefficient register file, corresponding to a column, all values in which are not 0 (zero), are transferred to the register, so that a parallel multiply-and-accumulate operation is executed a plurality of times in the multiply-and-accumulate operation unit. Thus, a second matrix vector multiplication is executed, and the result of the multiplication is accumulated in the accumulator.

A content of the third input register is transferred to the shift register. While shifting rightward the content of the shifter register one data word length by one data word length, values of a respective register in the third coefficient resister file, corresponding to a column, all values in which are not 0 (zero), are transferred to the register, so that a parallel multiply-and-accumulate operation is executed a plurality of times in the multiply-and-accumulate operation unit. Thus, a third matrix vector multiplication is executed, and the result of the multiplication is accumulated in the accumulator.

Thereafter, the value of the accumulator is stored in the third input register, and is outputted as a filter output. On the other hand, the value of the first input register is stored in the second input register.

Accordingly, the present invention can speed up the IIR filter operation which was, in the prior art, difficult to parallelize by the parallel multiply-and-accumulate operation. In addition, with the operation expression of the block IIR filter, if the order of the IIR decreases by one, the number of the parallel multiply-and-accumulate operations can be reduced by one, and if the order of the FIR decreases by one, the number of the parallel multiply-and-accumulate operations can be reduced by one.

If the first coefficient register file, the second input register, the second coefficient register file, the third input register, the third coefficient register file, the register and the shift register are provided in a register file of a microprocessor, and if the microprocessor has shift instructions for realizing the register and the shift register and divided-multiply-and-accumulate instructions for realizing the parallel multiply-and-accumulate operations, the above mentioned IIR filter can be realized on the microprocessor.

If the order of the FIR filter is larger than the block size "L", the block IIR processor can further includes a plurality of input registers coupled in series to receive the data of the second input register and to sequentially transfer the data, and a plurality of coefficient register files, so that a plurality of additional matrix vector multiplications are executed, and the result of the multiplications is accumulated in the accumulator.

If the order of the IIR filter is larger than the block size "L", the block IIR processor can further includes a plurality of input registers coupled in series to receive the data of the third input register and to sequentially transfer the data, and a plurality of coefficient register files, so that a plurality of additional matrix vector multiplications are executed, and the result of the multiplications is accumulated in the accumulator.

The above and other objects, features and advantages of the present invention will be apparent from the following description of preferred embodiments of the invention with reference to the accompanying drawings.

DESCRIPTION OF THE PREFERRED EMBODIMENT

Figure 1:
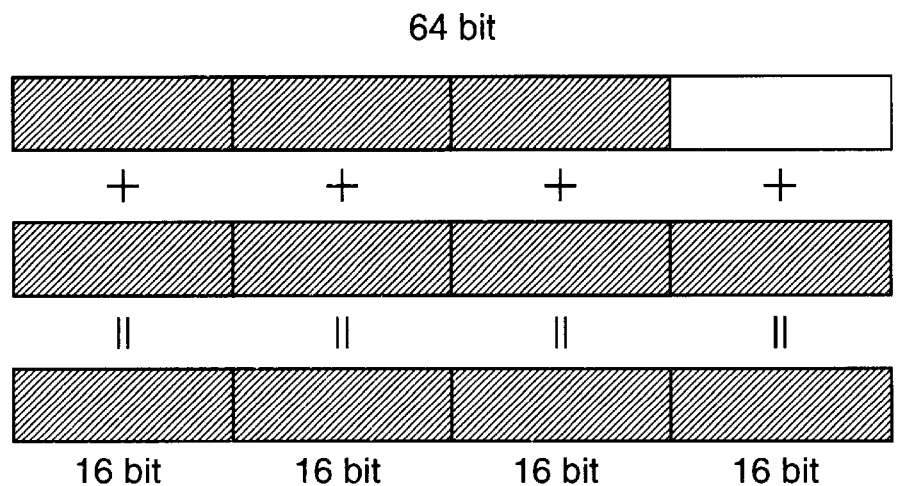
FIG. 1 illustrates a divided-ALU instruction.

Before describing an preferred embodiment of the block IIR processor in accordance with the present invention, the principle of the present invention will be described.

For deriving the block IIR processor, reference is made on Leland B. Jackson, "Digital Filters and Signal Processing", published by Kluwer Academic Publishers, 1986, pages 229–234, the content of which is incorporated by reference in its entirety into this application.

First, the following equation is considered to derive a block structure.

$$a_0 y(n) + a_1 y(n-1) + a_2 y(n-2) + a_3 y(n-3) = b_0 x(n) + b_1 x(n-1) + b_2 x(n-2) + b_3 x(n-3) \quad (1)$$

An output y(n) is given by the following equation (2)

$$y(n) = B_0^{-1}(-a_1 y(n-1) - a_2 y(n-2) - a_3 y(n-3) + b_0 x(n) + b_1 x(n-1) + b_2 x(n-2) + b_3 x(n-3)) \quad (2)$$

If it is assumed that $a_0$ is 1 for simplifying this equation, the following equation (3) can be obtained:

$$\begin{pmatrix} 1 & 0 & 0 & 0 & 0 & 0 & 0 & 0 \\ a_1 & 1 & 0 & 0 & 0 & 0 & 0 & 0 \\ a_2 & a_1 & 1 & 0 & 0 & 0 & 0 & 0 \\ a_3 & a_2 & a_1 & 1 & 0 & 0 & 0 & 0 \\ 0 & a_3 & a_2 & a_1 & 1 & 0 & 0 & 0 \\ 0 & 0 & a_3 & a_2 & a_1 & 1 & 0 & 0 \\ 0 & 0 & 0 & a_3 & a_2 & a_1 & 1 & 0 \\ 0 & 0 & 0 & 0 & a_3 & a_2 & a_1 & 1 \end{pmatrix} \begin{pmatrix} y_0 \\ y_1 \\ y_2 \\ y_3 \\ y_4 \\ y_5 \\ y_6 \\ y_7 \end{pmatrix} = \quad (3)$$

$$\begin{pmatrix} b_0 & 0 & 0 & 0 & 0 & 0 & 0 & 0 \\ b_1 & b_0 & 0 & 0 & 0 & 0 & 0 & 0 \\ b_2 & b_1 & b_0 & 0 & 0 & 0 & 0 & 0 \\ b_3 & b_2 & b_1 & b_0 & 0 & 0 & 0 & 0 \\ 0 & b_3 & b_2 & b_1 & b_0 & 0 & 0 & 0 \\ 0 & 0 & b_3 & b_2 & b_1 & b_0 & 0 & 0 \\ 0 & 0 & 0 & b_3 & b_2 & b_1 & b_0 & 0 \\ 0 & 0 & 0 & 0 & b_3 & b_2 & b_1 & b_0 \end{pmatrix} \begin{pmatrix} x_0 \\ x_1 \\ x_2 \\ x_3 \\ x_4 \\ x_5 \\ x_6 \\ x_7 \end{pmatrix}$$

Here, if a blocking is conducted with a block length "4", the following equation (4) can be obtained;

$$A_0 Y_k + A_1 Y_{k-1} = B_0 X_k + B_1 X_{k-1} \quad (4)$$

where $A_0$, $A_1$, $B_0$, $B_1$, $X_k$ and $Y_k$ are given as follows:

$$A_0 = \begin{pmatrix} 1 & 0 & 0 & 0 \\ a_1 & 1 & 0 & 0 \\ a_2 & a_1 & 1 & 0 \\ a_3 & a_2 & a_1 & 1 \end{pmatrix}, \quad A_1 = \begin{pmatrix} 0 & a_3 & a_2 & a_1 \\ 0 & 0 & a_3 & a_2 \\ 0 & 0 & 0 & a_3 \\ 0 & 0 & 0 & 0 \end{pmatrix}$$

$$B_0 = \begin{pmatrix} b_0 & 0 & 0 & 0 \\ b_1 & b_0 & 0 & 0 \\ b_2 & b_1 & b_0 & 0 \\ b_3 & b_2 & b_1 & b_0 \end{pmatrix}, \quad B_1 = \begin{pmatrix} 0 & b_3 & b_2 & b_1 \\ 0 & 0 & b_3 & b_2 \\ 0 & 0 & 0 & b_3 \\ 0 & 0 & 0 & 0 \end{pmatrix}$$

$$X_k = \begin{pmatrix} x_{k0} \\ x_{k1} \\ x_{k2} \\ x_{k3} \end{pmatrix}, \quad Y_k = \begin{pmatrix} y_{k0} \\ y_{k1} \\ y_{k2} \\ y_{k3} \end{pmatrix}$$

As this time, $Y_k$ is expressed as the following equation (5):

$$Y_k = -A_0^{-1} A_1 Y_{k-1} + A_0^{-1} B_0 X_k + A_0^{-1} B_1 X_{k-1} \quad (5)$$

Here, in this equation (5), respective coefficient matrixes $A_0^{-1} A_1$, $A_0^{-1} B_0$, and $A_0^{-1} B_1$ are expressed as the following equations (5-1), (5-2) and (5-3):

$$A_0^{-1} A_1 = \begin{pmatrix} 0 & a_3 & a_2 & a_1 \\ 0 & -a_1 a_3 & -a_1 a_2 + a_3 & -a_1^2 + a_2 \\ 0 & -a_2 a_3 + a_1^2 a_3 & -a_2^2 + a_2 a_1^2 - a_1 a_3 & -a_2 a_1 + a_1^3 - a_1 a_2 + a_3 \\ 0 & (2a_1 a_2 + a_1^3 - a_3)a_3 & (a_1^2 - 2a_2)a_3 + (2a_1 a_2 - a_1^3)a_2 & -a_3 a_1 + 2a_1^2 a_2 - a_1^4 - a_2^2 + a_1^2 a_2 - a_1 a_3 \end{pmatrix} \quad (5\text{-}1)$$

$$A_0^{-1} B_0 = \begin{pmatrix} b_0 & 0 & 0 & 0 \\ -a_1 b_0 + b_1 & b_0 & 0 & 0 \\ -a_2 b_0 + a_1^2 b_0 - a_1 b_1 + b_2 & -a_1 b_0 + b_1 & b_0 & 0 \\ -a_3 b_0 + 2a_1 a_2 b_0 - a_1^3 b_0 - a_2 b_1 + a_1^2 b_1 - a_1 b_2 + b_3 & (-a_2 + a_1^2)b_0 - a_1 b_1 + b_2 & -a_1 b_0 + b_1 & b_0 \end{pmatrix} \quad (5\text{-}2)$$

-continued $$A_0^{-1}B_1 = \begin{pmatrix} 0 & b_3 & b_2 & b_1 \\ 0 & -a_1b_3 & -a_1b_2+b_3 & -a_1b_1+b_2 \\ 0 & -a_2b_3+a_1^2b_3 & -a_2b_2+a_1^2b_2-a_1b_3 & -a_2b_1+a_1^2b_1-a_1b_2+b_3 \\ 0 & (2a_1a_2-a_1^3-a_3)b_3 & (2a_1a_2-a_1^3-a_3)b_2+(a_1^2-a_2)b_3 & (2a_1a_2-a_1^3-a_3)b_1+(a_1^2-a_2)b_2-a_1b_3 \end{pmatrix} \quad (5\text{-}3)$$

Considering that the function z() is a function which becomes 0 (zero) when all arguments are 0 (zero), respective items of the equation (5) can be expressed as the following equations (5-4) (5-5) and (5-6), and therefore, the equation (5) can be expressed as the following equation (5-7):

$$A_0^{-1}A_1Y_{k-1} = \begin{pmatrix} 0 & a_3 & a_2 & a_1 \\ 0 & z(a_3) & z(a_2,a_3) & z(a_1,a_2) \\ 0 & z(a_3) & z(a_2,a_3) & z(a_1,a_2,a_3) \\ 0 & z(a_3) & z(a_2,a_3) & z(a_1,a_2,a_3) \end{pmatrix} \begin{pmatrix} y_{(k-1)0} \\ y_{(k-1)1} \\ y_{(k-1)2} \\ y_{(k-1)3} \end{pmatrix} \quad (5\text{-}4)$$

$$A_0^{-1}B_0X_k = \quad (5\text{-}5)$$

$$\begin{pmatrix} b_0 & 0 & 0 & 0 \\ z_1(b_0,b_1) & b_0 & 0 & 0 \\ z_2(b_0,b_1,b_2) & z_1(b_0,b_1) & b_0 & 0 \\ z_3(b_0,b_1,b_2,b_3) & z_2(b_0,b_1,b_2) & z_1(b_0,b_1) & b_0 \end{pmatrix} \begin{pmatrix} x_{k0} \\ x_{k1} \\ x_{k2} \\ x_{k3} \end{pmatrix}$$

$$A_0^{-1}B_1X_{k-1} = \begin{pmatrix} 0 & b_3 & b_2 & b_1 \\ 0 & z(b_3) & z(b_2,b_3) & z(b_1,b_2) \\ 0 & z(b_3) & z(b_2,b_3) & z(b_1,b_2,b_3) \\ 0 & z(b_3) & z(b_2,b_3) & z(b_1,b_2,b_3) \end{pmatrix} \begin{pmatrix} x_{(k-1)0} \\ x_{(k-1)1} \\ x_{(k-1)2} \\ x_{(k-1)3} \end{pmatrix} \quad (5\text{-}6)$$

$$Y_k = -\begin{pmatrix} 0 & a_3 & a_2 & a_1 \\ 0 & z(a_3) & z(a_2,a_3) & z(a_1,a_2) \\ 0 & z(a_3) & z(a_2,a_3) & z(a_1,a_2,a_3) \\ 0 & z(a_3) & z(a_2,a_3) & z(a_1,a_2,a_3) \end{pmatrix} \begin{pmatrix} y_{(k-1)0} \\ y_{(k-1)1} \\ y_{(k-1)2} \\ y_{(k-1)3} \end{pmatrix} + \begin{pmatrix} b_0 & 0 & 0 & 0 \\ z_1(b_0,b_1) & b_0 & 0 & 0 \\ z_2(b_0,b_1,b_2) & z_1(b_0,b_1) & b_0 & 0 \\ z_3(b_0,b_1,b_2,b_3) & z_2(b_0,b_1,b_2) & z_1(b_0,b_1) & b_0 \end{pmatrix} \begin{pmatrix} x_{k0} \\ x_{k1} \\ x_{k2} \\ x_{k3} \end{pmatrix} + \begin{pmatrix} 0 & b_3 & b_2 & b_1 \\ 0 & z(b_3) & z(b_2,b_3) & z(b_1,b_2) \\ 0 & z(b_3) & z(b_2,b_3) & z(b_1,b_2,b_3) \\ 0 & z(b_3) & z(b_2,b_3) & z(b_1,b_2,b_3) \end{pmatrix} \begin{pmatrix} x_{(k-1)0} \\ x_{(k-1)1} \\ x_{(k-1)2} \\ x_{(k-1)3} \end{pmatrix} \quad (5\text{-}7)$$

Figure 2:
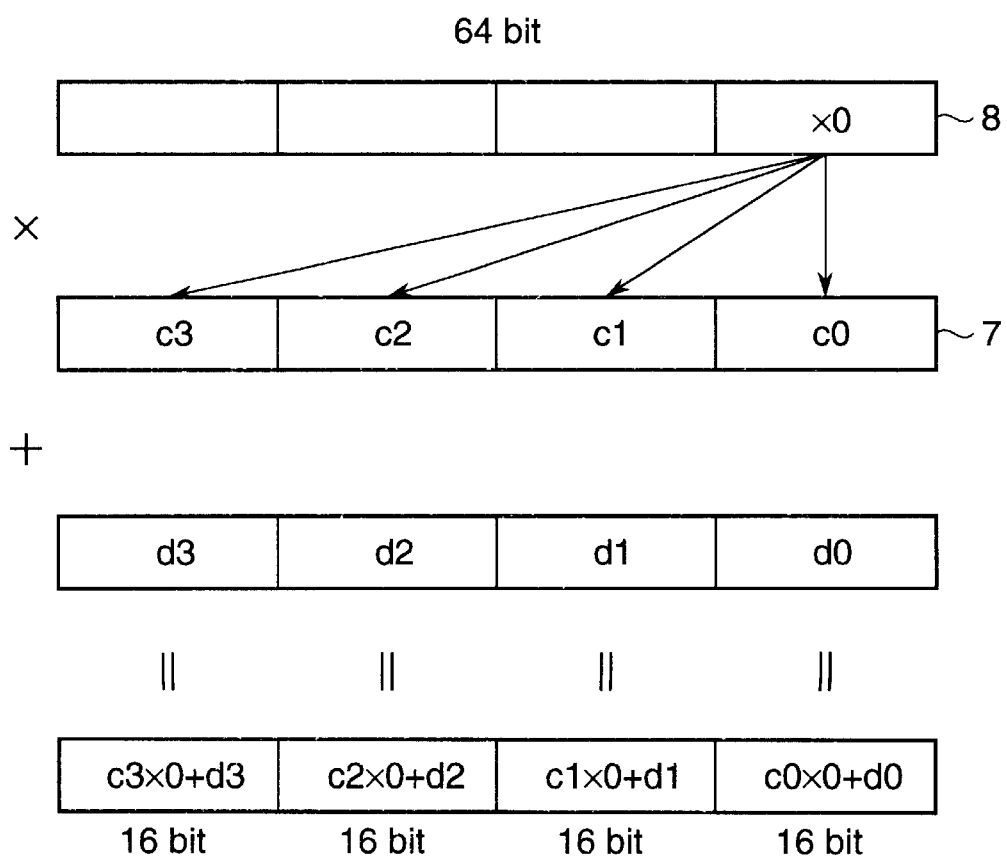
FIG. 2 illustrates an operation of a multiply-and-accumulate instruction.

The calculation of the above equation can be executed with ten parallel multiply-and-accumulate operations at maximum, by utilizing the fact that a multiply-and-accumulate computation for one column can be realized with one operation by means of the divided-ALU multiply-and-accumulate unit as shown in FIG. 2 (however, a shift operation is required other than the multiply-and-accumulate computation).

Furthermore, as seen from the coefficients for each matrix, if the order of the IIR decreases by one, the number of parallel multiply-and-accumulate operations can be reduced by one operation. In addition, if the order of a FIR (Finite Impulse Response) filter constituting the IIR filter, decreases by one, the number of parallel multiply-and-accumulate operations can be reduced by one operation.

The following table 1 illustrates the relation between the filter order and the efficiency improving rate when the block IIR system is realized by utilizing a four-divided MAC (multiply-and-add) instruction, assuming that the block length is 4. Here, the efficiency improving rate is defined as a ratio of the number of parallel multiply-and-accumulate operations executed when the parallelizing is not made, to the number of parallel multiply-and-accumulate operations executed when the parallelizing is made. However, an actual efficiency improving rate becomes small if the other operations including the data shifting is considered.

TABLE 1

| ORDER | SECOND-ORDER FIR | THIRD-ORDER FIR | FOURTH-ORDER FIR |
|---|---|---|---|
| FIRST-ORDER IIR | 2.0 (12/6) | 2.28 (16/7) | 2.5 (20/8) |
| SECOND-ORDER IIR | 2.28 (16/7) | 2.5 (20/8) | 2.67 (24/9) |
| THIRD-ORDER IIR | 2.5 (20/8) | 2.67 (24/9) | 2.8 (28/10) |

Now, the preferred embodiment of the block IIR processor in accordance with the present invention based on the above mentioned principle, will be described with reference to FIG. 3. The shown block IIR processor includes a first input register 1 storing data of the block length "L" and capable of shifting the stored data by integer times the data word length, a first coefficient register file 2, a second input register 3, a second coefficient register file 4, a third input register 5, a third coefficient register file 6, a register 7, a shift register 8, an accumulator 10 and a multiply-and-accumulate unit 9 for multiplying respective data blocks in the register 7 by a least significant word in the shift register 8, and for adding the result of the multiplication to a value of the accumulator 10, for executing a parallel operation of "L" multiply-and-accumulate operations.

As mentioned hereinbefore, FIG. 1 illustrates the example of the divided-ALU instruction, which is an instruction for utilizing, for example, a 64-bit ALU as four 16-bit ALUs.

In addition, FIG. 2 diagrammatically illustrates the parallel multiply-and-accumulate operation in the multiply-and-accumulate unit 9. As shown in FIG. 2, the multiply-and-accumulate unit 9 executes the parallel multiply-and-accumulate operation, by multiplying respective data blocks (namely, data words) "c"3 to "c0" of the register 7 with a least significant data word "x0", and by accumulating the result of the multiplication to respective values "d3" to "d0" of the accumulator 10.

In this embodiment, the speed-up of the IIR filter defined by the following equation (6) will be explained as an example.

$$y(n) = a_0^{-1}(-a_1 y(n-1) - a_2 y(n-2) - a_3 y(n-3) + b_0 x(n) + b_1 x(n-1) + b_2 x(n-2) + b_3 x(n-3)) \quad (6)$$

As mentioned hereinbefore, by blocking with the block length "4", the equation (6) can be expressed as the following equation (7):

$$Y_k = -A_0^{-1}A_1Y_{k-1} + A_0^{-1}B_0X_k + A_0^{-1}B_1X_{k-1} \quad (7)$$

Here, respective coefficient matrixes $A_0^{-1}A_1$, $A_0^{-1}B_0$, and $A_0^{-1}B_1$ are expressed as the following equations (7-1), (7-2) and (7-3):

$$A_0^{-1}A_1 = \begin{pmatrix} 0 & a_3 & a_2 & a_1 \\ 0 & -a_1a_3 & -a_1a_2 + a_3 & -a_1^2 + a_2 \\ 0 & -a_2a_3 + a_1^2a_3 & -a_2^2 + a_2a_1^2 - a_1a_3 & -a_2a_1 + a_1^3 - a_1a_2 + a_3 \\ 0 & (2a_1a_2 + a_1^3 - a_3)a_3 & (a_1^2 - 2a_2)a_3 + (2a_1a_2 - a_1^3)a_2 & -a_3a_1 + 2a_1^2a_2 - a_1^4 - a_2^2 + a_1^2a_2 - a_1a_3 \end{pmatrix} \quad (7\text{-}1)$$

$$A_0^{-1}B_0 = \begin{pmatrix} b_0 & 0 & 0 & 0 \\ -a_1b_0 + b_1 & b_0 & 0 & 0 \\ -a_2b_0 + a_1^2b_0 - a_1b_1 + b_2 & -a_1b_0 + b_1 & b_0 & 0 \\ -a_3b_0 + 2a_1a_2b_0 - a_1^3b_0 - a_2b_1 + a_1^2b_1 - a_1b_2 + b_3 & (-a_2 + a_1^2)b_0 - a_1b_1 + b_2 & -a_1b_0 + b_1 & b_0 \end{pmatrix} \quad (7\text{-}2)$$

$$A_0^{-1}B_1 = \begin{pmatrix} 0 & b_3 & b_2 & b_1 \\ 0 & -a_1b_3 & -a_1b_2 + b_3 & -a_1b_1 + b_2 \\ 0 & -a_2b_3 + a_1^2b_3 & -a_2b_2 + a_1^2b_2 - a_1b_3 & -a_2b_1 + a_1^2b_1 - a_1b_2 + b_3 \\ 0 & (2a_1a_2 - a_1^3 - a_3)b_3 & (2a_1a_2 - a_1^3 - a_3)b_2 + (a_1^2 - a_2)b_3 & (2a_1a_2 - a_1^3 - a_3)b_1 + (a_1^2 - a_2)b_2 - a_1b_3 \end{pmatrix} \quad (7\text{-}3)$$

Therefore, first, in order to calculate a second item of a right side of the equation (7), namely, $$C1 = A_0^{-1}B_0X_k \quad (8)$$

respective columns of this "C1" are previously stored in respective registers of the first coefficient register file 2.

Then, four data items corresponding to the block length "L" is stored in the first input register 1, and a content of the first input register 1 is transferred to the shift register 8. While shifting rightward the content of the shifter register 8 one data word length by one data word length, values of a respective register in the first coefficient register file 2, corresponding to a column, all values in which are not 0 (zero), are transferred to the register 7, and a parallel multiply-and-accumulate operation is executed four times in the multiply-and-accumulate operation unit 9. Thus, a first matrix vector multiplication is executed, and the result of the multiplication is accumulated in the accumulator 10.

Then, in order to calculate a third item of the right side of the equation (7), namely, $$C2 = A_0^{-1}B_1X_{k-1} \quad (9)$$

respective columns of this "C2" are previously stored in respective registers of the second coefficient register file 4.

A content of the second input register 3 is transferred to the shift register 8. While shifting rightward the content of the shifter register 8 one data word length by one data word length, values of a respective register in the second coefficient register file 4, corresponding to a column, all values in which are not 0 (zero), are transferred to the register 7, so that a parallel multiply-and-accumulate operation is executed three times at maximum in the multiply-and-accumulate operation unit 9. Thus, a second matrix vector multiplication is executed, and the result of the multiplication is accumulated in the accumulator 10.

At this time, because of the nature of the coefficient matrix mentioned hereinbefore, (1) when the order of FIR is 3, since $b_3$ becomes 0 (zero), the multiply-and-accumulate operation using the second column of C2 as the coefficient, can be omitted;

(2) when the order of FIR is 2, since $b_3$ and $b_2$ become 0 (zero), the multiply-and-accumulate operation using the second and third columns of C2 as the coefficient, can be omitted; and (3) when the order of FIR is 1, since $b_3$, $b_2$ and $b_1$ become 0 (zero), the multiply-and-accumulate operation using the second, third and fourth columns of C2 as the coefficient, can be omitted.

Then, in order to calculate a first item of the right side of the equation (7), namely, $$C3 = A_0^{-1}A_1X_{k-1} \quad (10)$$

respective columns of this "C3" are previously stored in respective registers of the third coefficient register file 6.

A content of the third input register 5 is transferred to the shift register 8. While shifting rightward the content of the shifter register 8 one data word length by one data word length, values of a respective register in the third coefficient register file 6, corresponding to a column, all values in which are not 0 (zero), are transferred to the register 7, so that a parallel multiply-and-accumulate operation is executed three times at maximum in the multiply-and-accumulate operation unit 9. Thus, a third matrix vector multiplication is executed, and the result of the multiplication is accumulated in the accumulator 10.

At this time, because of the nature of the coefficient matrix mentioned hereinbefore, (1) when the order of IIR is 2, since $a_3$ becomes 0 (zero), the multiply-and-accumulate operation using the second column of C3 as the coefficient, can be omitted;

(2) when the order of IIR is 1, since $a_3$ and $a_2$ become 0 (zero), the multiply-and-accumulate operation using the second and third columns of C3 as the coefficient, can be omitted; and (3) when the order of IIR is 0, since $a_3$, $a_2$ and $a_1$ become 0 (zero), the multiply-and-accumulate operation using the second, third and fourth columns of C3 as the coefficient, can be omitted.

Finally, the value of the accumulator 10 is stored in the third input register 5, and is outputted as a filter output. On the other hand, the value of the first input register 1 is stored in the second input register 3.

As mentioned above, in the embodiment of the present invention, since the parallel multiply-and-accumulate operation for one column in each coefficient matrix can be executed with one operation by means of the multiply-and-accumulate unit 9, the above mentioned block filter operation can be executed by ten parallel multiply-and-accumulate operations at maximum.

Furthermore, because of the nature of the coefficient matrix of the block IIR filter, if the order of the IIR decreases by one, the number of the parallel multiply-and-accumulate operations can be reduced by one, and if the order of the FIR decreases by one, the number of the parallel multiply-and-accumulate operations can be also reduced by one.

Figure 3:
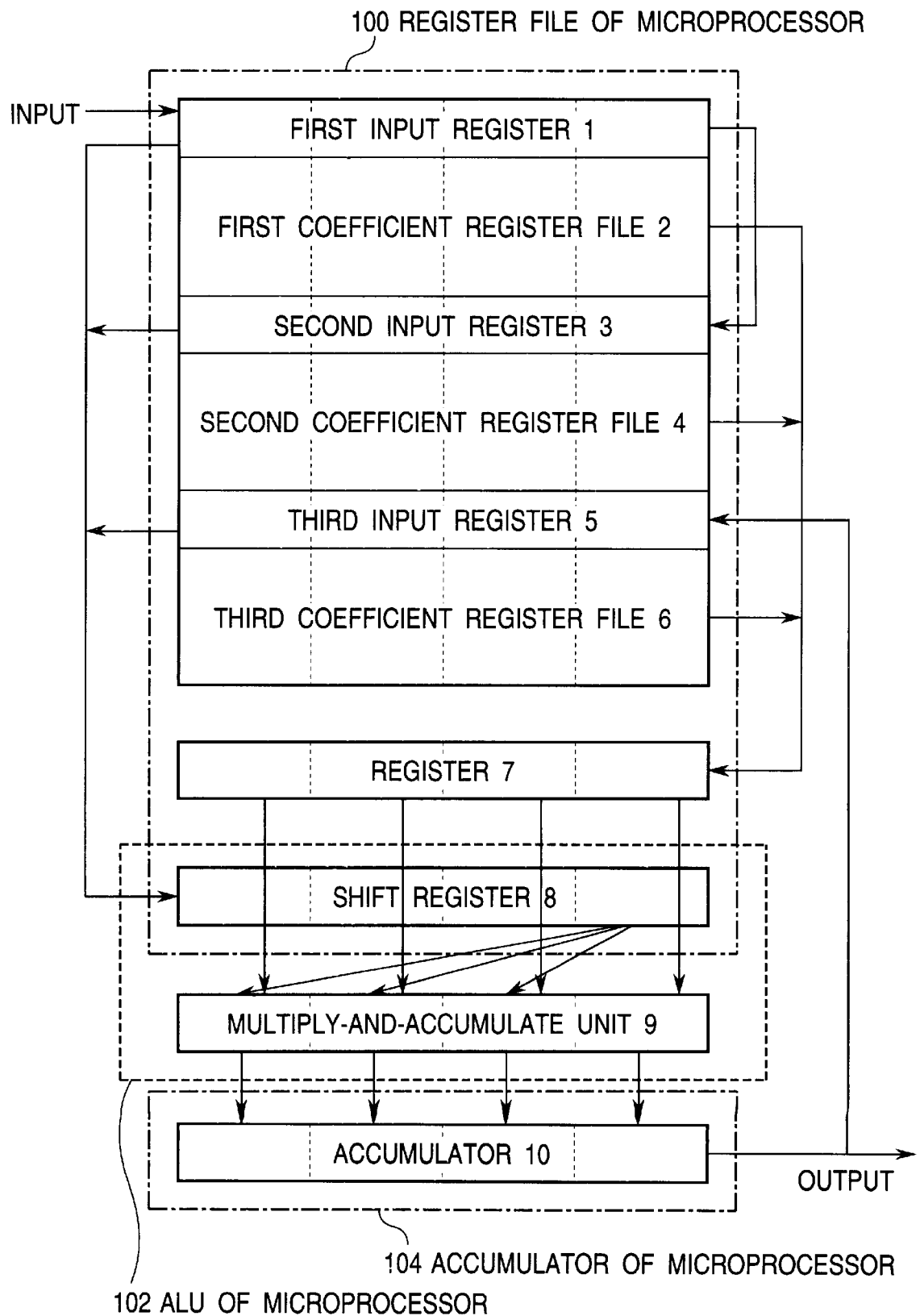
FIG. 3 is a block diagram of an embodiment of the block IIR processor in accordance with the present invention.

In addition, as shown with a chain line in FIG. 3, the first input register 1, the first coefficient register file 2, the second input register 3, the second coefficient register file 4, the third input register 5, the third coefficient register file 6, the register 7 and the shift register 8 in the above mentioned embodiment can be provided for example in a register file 100 of a microprocessor. Specifically, a data holding function of the shift register 8 is prepared in the register file 100 of the microprocessor, but a shifting function of the shift register 8 is realized by an ALU of the microprocessor. Therefore, the shifting function of the shift register 8 and the multiply-and-accumulate unit 9 can be provided in an ALU 102 of a microprocessor, and the accumulator 10 can be provided in an accumulator 104 of a microprocessor. Accordingly, if shift instructions for realizing the register 7 and the shift register 8 and divided-multiply-and-accumulate instructions for realizing the parallel multiply-and-accumulate operations are provided for the microprocessor, the above mentioned IIR filter can be realized on the microprocessor.

Moreover, in the above mentioned block IIR processor, if the order of the FIR filter is larger than the block size "4", it is possible to additionally provide a plurality of input registers coupled in series to receive the data of the second input register 2 and to sequentially transfer the data, and a plurality of coefficient register files, so that a plurality of additional matrix vector multiplications are executed, and the result of the multiplications is accumulated in the accumulator.

Alternatively, in the above mentioned block IIR processor, if the order of the IIR filter is larger than the block size "4", it is possible to additionally provide a plurality of input registers coupled in series to receive the data of the third input register 5 and to sequentially transfer the data, and a plurality of coefficient register files, so that a plurality of additional matrix vector multiplications are executed, and the result of the multiplications is accumulated in the accumulator.

As seen from the above, according to the present invention, in the IIR filter which was considered difficult to parallelize the processing because a signal flow is recursive and which was also considered difficult to speed up the processing even by means of the divided-ALU operation, by adopting the block IIR filter algorithm which makes it possible to simultaneously calculate a plurality of samples in a processor having a divided-ALU instructions for executing a plurality of multiply-and-accumulate operations in parallel to one another, the filter operation can be speeded up by use of the parallel arithmetic operation.

Furthermore, it is also possible to realize a high speed operation by reducing the number of multiply-and-accumulate operations in accordance with the order of the filter because of the nature of coefficients.

The invention has thus been shown and described with reference to the specific embodiments. However, it should be noted that the present invention is in no way limited to the details of the illustrated structures but changes and modifications may be made within the scope of the appended claims.

What is claimed is:

1. A block IIR processor comprising a first input register storing data of the block length "L" and capable of shifting the stored data by an integer times a data word length, a first coefficient register file, a second input register, a second coefficient register file, a third input register, a third coefficient register file, a register, a shift register, an accumulator and a multiply-and-accumulate unit for multiplying respective data blocks in the register by a least significant word in the shift register, and for adding the result of the multiplication to a value of the accumulator, for executing a parallel operation of "L" multiply-and-accumulate operations, wherein input data of the block size "L" is stored in the first input register, and a content of the fist input register is transferred to the shift register, and while shifting rightward the content of the shifter register one data word length by one data word length, values of a respective register in the first coefficient register file, corresponding to a column, all values in which are not 0 (zero), are transferred to the register, so that a parallel multiply-and-accumulate operation is executed a plurality of times in the multiply-and-accumulate operation unit, with the result that a first matrix vector multiplication is executed, and then, the result of the multiplication is accumulated in the accumulator, wherein a content of the second input register is transferred to the shift register, and while shifting rightward the content of the shifter register one data word length by one data word length, values of a respective register in the second coefficient register file, corresponding to a column, all values in which are not 0 (zero), are transferred to the register, so that a parallel multiply-and-accumulate operation is executed a plurality of times in the multiply-and-accumulate operation unit, with the result that a second matrix vector multiplication is executed, and then, the result of the multiplication is accumulated in the accumulator, wherein a content of the third input register is transferred to the shift register, and while shifting rightward the content of the shifter register one data word length by one data word length, values of a respective register in the third coefficient register file, corresponding to a column, all values in which are not 0 (zero), are transferred to the register, so that a parallel multiply-and-accumulate operation is executed a plurality of times in the multiply-and-accumulate operation unit, with the result that a third matrix vector multiplication is executed, and then, the result of the multiplication is accumulated in the accumulator, and wherein the value of the accumulator is stored in the third input register, and is outputted as a filter output, and the value of the first input register is stored in the second input register.

2. A block IIR processor claimed in claim 1 wherein said first coefficient register file, said second input register, said second coefficient register file, said third input register, said third coefficient register file, said register and said shift register are provided in a register file of a microprocessor, and wherein said microprocessor has shift instructions for realizing said register and said shift register and divided-multiply-and-accumulate instructions for realizing said parallel multiply-and-accumulate operations.

3. A block IIR processor claimed in claim 1 wherein the order of the FIR filter is larger than said block size "L", and further including a plurality of input registers coupled in series to receive the data of said second input register and to sequentially transfer the data, and a plurality of coefficient register files, so that a plurality of additional matrix vector multiplications are executed, and the result of the multiplications is accumulated in said accumulator.

4. A block IIR processor claimed in claim 1 wherein the order of the IIR filter is larger than said block size "L", and further including a plurality of input registers coupled in series to receive the data of said third input register and to sequentially transfer the data, and a plurality of coefficient register files, so that a plurality of additional matrix vector multiplications are executed, and the result of the multiplications is accumulated in said accumulator.

* * * * *